(No Model.)
G. A. BRACHHAUSEN & A. WOLFF.
CRANK ARM.
No. 534,135. Patented Feb. 12, 1895.
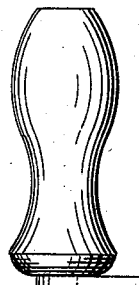
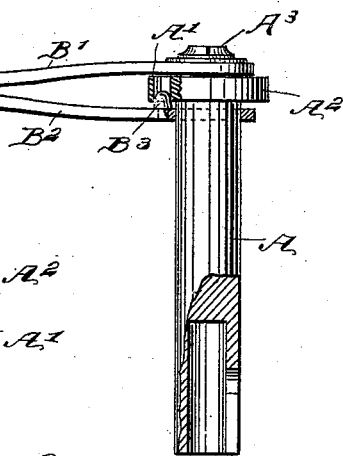
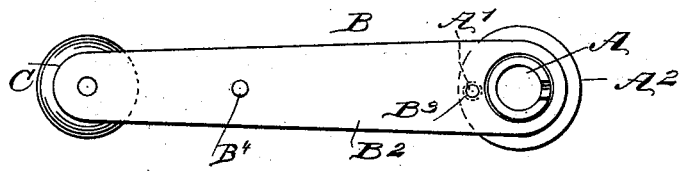
WITNESSES:
Chas Nider
C. Sedgwick
INVENTORS
G. A. Brachhausen
A. Wolff
BY Munn & Co.
ATTORNEYS

UNITED STATES PATENT OFFICE.

GUSTAV ADOLPF BRACHHAUSEN, OF JERSEY CITY, AND ALFRED WOLFF, OF RUTHERFORD, NEW JERSEY.

CRANK-ARM.

SPECIFICATION forming part of Letters Patent No. 534,135, dated February 12, 1895.

Application filed January 8, 1894. Serial No. 496,105. (No model.)

*To all whom it may concern:*

Be it known that we, GUSTAV ADOLPF BRACHHAUSEN, of Jersey City, in the county of Hudson, and ALFRED WOLFF, of Rutherford, in the county of Bergen, State of New Jersey, have invented a new and Improved Crank-Arm, of which the following is a full, clear, and exact description.

The invention relates to crank arms such as are used for winding the springs of music boxes, and particularly to devices for preventing over-winding and consequent breaking of the springs in music boxes or other instruments in which a main spring is to be wound up to form the motive power.

The object of our invention is to produce an improved crank arm of the above indicated class, which will be simple in construction, yet very strong and durable, and so constructed as to effectively prevent the spring of a music box or other instrument to which the crank arm is applied, from being broken by the operator continuing to wind after the spring has been given the maximum tension it can be subjected to with safety.

The invention consists of certain parts and details, and combinations of the same, that will be hereinafter described and claimed.

Reference is to be had to the accompanying drawings, in which—

Figure 1 is a side elevation of the improved crank arm, with parts in section. Fig. 2 is an inverted plan view of the same; and Fig. 3 is a similar view of the crank arm with the arm proper released from the spindle.

Like letters of reference indicate corresponding parts in all the views.

The improved crank arm comprises a spindle or shank adapted to engage a shaft operatively connected with the spring to be wound, a crank arm proper on the said spindle, and means whereby the crank arm is normally held to rotate with the spindle, yet allowed to turn independently thereof when the spring has been fully wound up.

The spindle or shank A is constructed to engage, at its lower end, see Fig. 1, the shaft of the spring barrel containing the spring and connected with one end of the said shaft. On the said spindle is secured or formed a disk $A^2$, provided with an aperture or recess $A'$, for a purpose stated hereinafter.

B is the crank arm proper, which consists of two members $B'$ and $B^2$, of which the lower one, $B^2$, at least is made of an elastic material, so that it is capable of a yielding movement toward and from the other arm. Each of the arms is apertured at one end to receive the spindle A, while the other ends of the arms are secured together, and this end of the crank arm carries a handle C. As shown in Figs. 1 and 2, the arms $B'$ $B^2$ are further connected, between the handle and the spindle, by means of a screw $B^4$, which also permits of adjusting the tension of the spring member or members, corresponding to the maximum tension it is desired to give the spring to be wound up. The lower member $B^2$ is provided with a lug or projection $B^3$, adapted to normally engage the aperture or recess $A'$ in the disk $A^2$. The lug should be made of conical or globular shape, so as to have inclined sides. As illustrated by Fig. 1, the upper member $B'$ is held against longitudinal displacement upon the spindle by the means of the disk $A^2$ on one side and a nut $A^3$ or equivalent device on the other side, it being understood that the disk $A^2$ is located between the crank arm members $B'$ and $B^2$.

The operation of the device will be readily understood. When the spindle A is put upon the winding shaft of the spring, the lug $B^3$ being in the recess $A'$, and the crank arm is turned by means of the handle C, the spindle A will be compelled to rotate with the arm B, thus gradually increasing the tension of the spring to be wound up. It will be obvious that a gradually increasing resistance will be opposed to the rotation of the spindle A, and when the spring is fully wound up, this resistance will be sufficient to overcome the tension of the spring member $B^2$ and force the lug $B^3$ out of the recess $A'$, thereby uncoupling the arm B from the spindle A, so that a further turning of the arm B will not cause the spindle to rotate and therefore will have no influence upon the tension of the spring. Thus it will be seen that a certain maximum of tension will not be exceeded, and breaking of the spring in consequence of over-winding is impossible with our improved crank arm. By means of the screw $B^4$, the tension of the member $B^2$ may be adjusted to correspond to the maximum tension the spring to be wound is capable of bearing with safety.

The whole device is very compact and strong, and reliable in operation. The arm B as described is so constructed as to form its own releasing device to allow it to turn independently of the spindle A whenever the spring to be wound is brought to its predetermined maximum of tension.

What we claim as our invention, and desire to secure by Letters Patent, is—

The combination of the spindle provided with a recessed disk, an arm consisting of two members constructed to receive the spindle and arranged on opposite sides of the disk, a lug on one of the arms, said lug being adapted to engage the recess in the disk, and adjusting means connecting the members of the arm at a distance from the spindle to permit of varying the tension of the member carrying the lug, substantially as described.

GUSTAV ADOLPF BRACHHAUSEN.
ALFRED WOLFF.

Witnesses to the signature of Gustav A. Brachhausen:
LUDWIG TIETZ,
RUD. WACKERHAGEN.

Witnesses to the signature of Alfred Wolff:
THEO. G. HOSTER,
C. SEDGWICK.